(12) United States Patent
Rahman

(10) Patent No.: US 8,411,657 B2
(45) Date of Patent: Apr. 2, 2013

(54) RADIO ACCESS NETWORK NODE WITH IP INTERFACE

(75) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 315 days.

(21) Appl. No.: 12/839,240

(22) Filed: Jul. 19, 2010

(65) Prior Publication Data

US 2012/0014317 A1    Jan. 19, 2012

(51) Int. Cl.
*H04W 4/00* (2009.01)
(52) U.S. Cl. ........................................ 370/338
(58) Field of Classification Search .................. None
See application file for complete search history.

(56) References Cited

U.S. PATENT DOCUMENTS

| | | | |
|---|---|---|---|
| 7,120,460 B2 | 10/2006 | Shaheen | |
| 7,302,497 B2 | 11/2007 | Vilander | |
| 7,391,754 B2 | 6/2008 | Bae | |
| 7,505,431 B2 | 3/2009 | Chitrapu | |
| 2002/0095662 A1 | 7/2002 | Ashlock | |
| 2003/0185188 A1* | 10/2003 | Chitrapu et al. | 370/338 |
| 2004/0076179 A1 | 4/2004 | Kaminski | |
| 2004/0174816 A1 | 9/2004 | Stewart | |
| 2005/0210154 A1 | 9/2005 | Verma | |
| 2005/0239461 A1 | 10/2005 | Verma | |
| 2006/0128362 A1* | 6/2006 | Bae et al. | 455/411 |
| 2010/0014507 A1 | 1/2010 | Linkola | |
| 2010/0077102 A1 | 3/2010 | Lim | |
| 2010/0322218 A1* | 12/2010 | Liu | 370/338 |

* cited by examiner

*Primary Examiner* — Clemence Han
(74) *Attorney, Agent, or Firm* — Moazzam & Associates, LLC

(57) ABSTRACT

Devices, systems, and methods are disclosed to directly connect a node of a Radio Access Network (RAN) with an Internet Protocol (IP) network. The node is provided with an interface to a broadband local loop network. Access to the local loop network or last mile enables the node to communicate directly with an IP network, including an IP Multimedia System (IMS) core. The node need not access a packet-switched core network via a controller. Embodiments include a Node B with an IP interface in a UMTS system and a Base Transceiver Station (BTS) with an IP interface in a GSM system.

16 Claims, 5 Drawing Sheets

RADIO ACCESS NETWORK NODE WITH IP INTERFACE

BACKGROUND OF THE INVENTION

1. Field of the Invention

The present invention relates to mobile networks. In particular, the present invention provides an Internet Protocol (IP) interface to a node within a Radio Access Network (RNC).

2. Background of the Invention

In modern cellular networks, Internet Protocol (IP) addressing is being used more extensively than ever before. Mobile devices are equipped with not only cellular transceivers but also data MODEMs such as General Packet Radio Service (GPRS) transceivers, Wi-Fi transceivers, etc. Further, additional network elements such as those that are part of an IP Multimedia System (IMS) use IP addressing to transmit data packets across network elements.

However, these network elements are not being used to the fullest potential. A UMTS Terrestrial Radio Access Network (UTRAN) includes, inter alia, a plurality of nodes such as Node Bs (equivalent to GSM Base Transceiver Stations) that are controlled by a controller such as a Radio Network Controller (RNC). The RNC interfaces with other network elements such as a Mobile Switching Center (MSC), and gateways enabling communication with IP networks, such as G-GSN and S-GSN. This structure is useful for standard voice traffic, wherein the RNC forwards the voice data and works with the MSC to set up voice connections with other mobile devices, PSTN networks, etc. The problem arises when a mobile device attempts to transmit IP data packets, such as Voice Over IP (VoIP), etc. The VoIP data has to traverse the RAN, from the node all the way to the RNC or MSC, before it is determined to be destined for an IP network, for instance, an IP Multimedia System (IMS) core network that handles most VoIP traffic and sets up sessions between VoIP participants. This data unnecessarily adds a burden to the Radio Access Network to process different kinds of data. Additionally, at times when the RNC or either of its IP gateways (SGSN, GGSN) is not operational or unavailable for any reason, the connection is lost. There currently exists no means to provide an alternative means to connect directly to the IP core on a need basis.

Therefore, what is needed is a device, system, and method to enable a RAN node to bypass the RNC and communicate directly with the IMS core network.

SUMMARY OF THE INVENTION

The present invention solves the above problems by enabling a node of a Radio Access Network (RAN) to interface directly with an Internet Protocol (IP) network. The node is provided with an interface to a broadband local loop network. Access to the local loop network, or last mile, enables the node to communicate directly with an IP network, including an IP Multimedia System (IMS) core. The node need not access a packet-switched core network via a controller. Embodiments include a Node B with an IP interface in a UMTS system and a Base Transceiver Station (BTS) with an IP interface in a GSM system.

In one exemplary embodiment, the present invention is a node in a Radio Access Network (RAN), including a transceiver, an antenna coupled to the transceiver, the antenna receiving signals from a mobile device, a processor in communication with the transceiver, a memory in communication with the processor, and an Internet Protocol (IP) interface in communication with the processor, the IP interface providing the node with access to an IP network. The system further comprises an interface to a controller, the controller being in communication with a cellular network. The controller can be a Radio Network Controller (RNC) or a Base Station Controller (BSC). The node can be a Node B or a Base Transceiver Station (BTS). Logic on the memory receives a packet from the mobile device, determines that the packet is destined for the IP network, and forwards the packet to the IP interface. The logic further receives a second packet from the mobile device, determines that the packet is destined for the cellular network, and forwards the packet to the controller. The IP interface communicates with an edge router on a broadband network, such as a wireless local loop that provides access to an IP Multimedia System (IMS) network.

In another exemplary embodiment, the present invention is a system for communicating with an IP Multimedia System (IMS) network, the system including a node within a Radio Access Network (RAN), the node including an antenna to receive signals from a mobile device, and an interface to communicate with a wireless local loop, a controller in communication with the node, a plurality of gateways in communication with the node, the plurality of gateways enabling communication between the controller and the IMS network; and an edge router on the wireless local loop, the edge router enabling communication between the node and the IMS network. A data packet destined for the IMS network is transmitted to the IMS network via the interface to the wireless local loop. The plurality of gateways includes at least one of a Serving GPRS Support Node (SGSN) and a Gateway GPRS Support Node (GGSN). The wireless local loop may be a fiber-to-the-node (FTTN) network, the FTTN network further comprising a core router and a session border controller (SBC). The node can be a femtocell.

In yet another exemplary embodiment, the present invention is a method for communicating with an IP Multimedia System (IMS) network, the method including receiving a data packet from a mobile device across a wireless network, determining that the data packet is destined for an IP Multimedia System (IMS) network, determining that a controller in communication with a gateway is unavailable, the gateway being part of a packet-switched (PS) core network, and forwarding the data packet to a wireless local loop network, wherein the wireless local loop network is in communication with the IMS network.

DETAILED DESCRIPTION OF THE INVENTION

Figure 1:
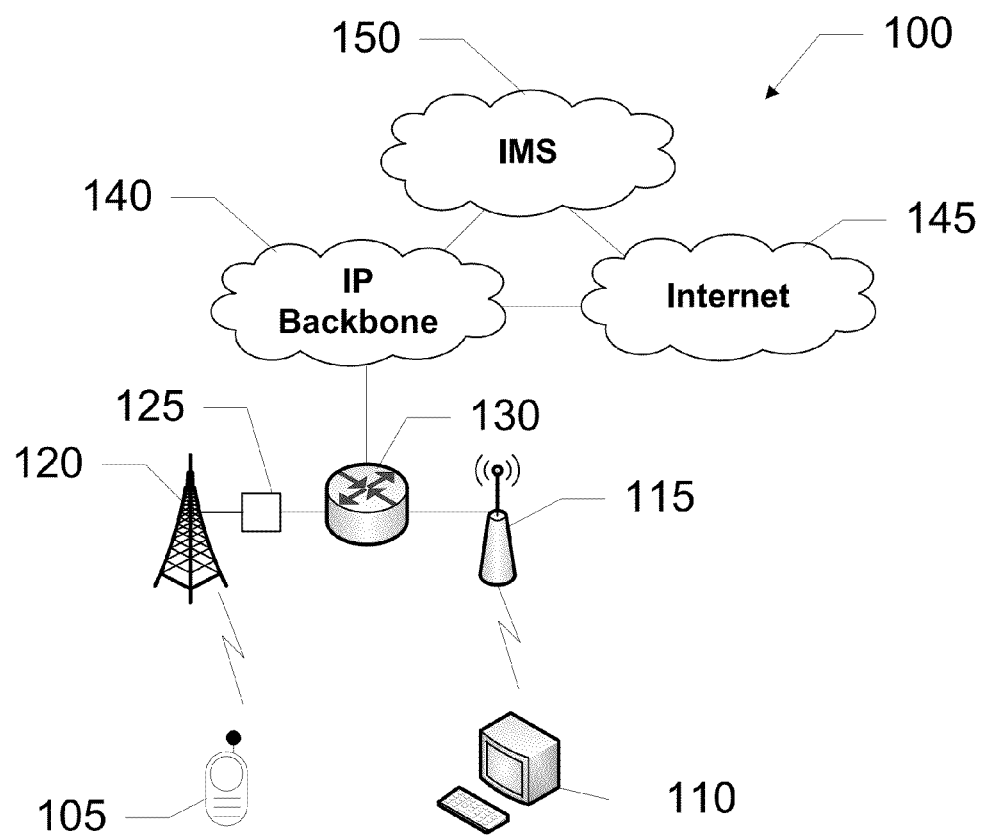
FIG. 1 shows a system for communicating with an IMS network, according to an exemplary embodiment of the present invention.

The present invention provides devices, systems, and methods to directly connect a node of a Radio Access Network (RAN) with an Internet Protocol (IP) network. The node is provided with an interface to a broadband local loop network. Access to the local loop network, or last mile, enables the node to communicate directly with an IP network, including an IP Multimedia System (IMS) core. The node need not access a packet-switched core network via a controller. Embodiments include a Node B with an IP interface in a UMTS system and a Base Transceiver Station (BTS) with an IP interface in a GSM system.

As used herein and throughout this disclosure, the term "mobile device" refers to any electronic device capable of communicating across a mobile network. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include UMTS, GSM, CDMA, WLAN and BLUETOOTH® networks, with communication being enabled by transceivers. Other examples of networks include broadband local loop networks, such as wireless local loop, fiber-to-the-node (FTTN), etc. Networks also include the IP Multimedia System (IMS) core network. The IP Multimedia Subsystem (IMS) is an architectural framework for delivering Internet Protocol (IP) multimedia services. See, for instance, 3GPP Technical Specification TS 23.228. Briefly, the IMS core network predominantly consists of the Call Session Control Function (CSCF) and the Home Subscriber Server (HSS). The CSCF node facilitates SIP session setup and teardown. The HSS plays the role of a location server in IMS, in addition to acting as an AAA server. The HSS also serves as a single point of provisioning for IMS subscribers and their services. Other servers are present such as proxy servers, routers such as Wide-Area Network routers, media gateways, etc.

A network typically includes a plurality of elements such as servers that host logic for performing tasks on the network. Servers may be placed at several logical points on the network. Servers may further be in communication with databases and can enable communication devices to access the contents of a database. For instance, Radio Access Networks (RAN), include a controller having a database of every radio access point (Node B or a WLAN hotspot). An example of a controller is a Radio Network Controller, which carries out radio resource management, some mobility management functions, and is the point where encryption is performed before data is sent to and from the mobile device. A node of a RAN provides a radio interface whereby a mobile device having a transceiver can access a network such as a service provider's network or a private network. A node can be a cellular base transceiver station (BTS), Node B, or any other means for accessing a network, such as a Wireless LAN hotspot, femtocell, and equivalents thereof. For the purposes of this disclosure, a Node B is equivalent to a BTS, and an RNC is equivalent to a BSC.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for communicating with an IMS network, according to an exemplary embodiment of the present invention. System 100 includes mobile devices 105 and 110, respectively in communication with a node 120 of a RAN and an access point 115 of a broadband network. The broadband network includes a router 130, and an IP backbone 140. IP backbone 140 is connected to the internet 145, as well as to IMS core network 150.

According to the present invention, node 120 is equipped with an IP interface 125 enabling node 120 to access an IP network. In the exemplary embodiment, this access is provided via edge router 130. For instance, the IP interface may be similar to the packet control unit (PCU) found between a controller of node 120 and a prior-art gateway. The PCU coupled to node 120 uses any of the traditional BSS interfaces such as Au, Urn, Abis, Gb, Gn interfaces, or a new proprietary interface. The IP interface provides an IP address to node 120 that can be registered with a service provider of the IP service, wherein the service provider's DNS servers, etc. reside on IP backbone 140. Once IP backbone 140 registers node 120, traffic can flow as usual between networks such as Internet 145, and IMS core 150. Consequently, VoIP and other data from mobile device 105 flows via node 120, through IP backbone 140, and directly to IMS 150, without having to traverse an RNC, BSC, and any associated packet-switched core network such as GPRS, etc.

Further, router 130 can share IP backbone 140 with other access points such as WLAN access point 115. Where terminal 110 accesses the internet 145 and IMS core 150 via WLAN access point 115 that provides access to service provider's IP backbone 140, the same access is provided to mobile device 105 via the combination of node 120 and IP interface 125.

Figure 2:
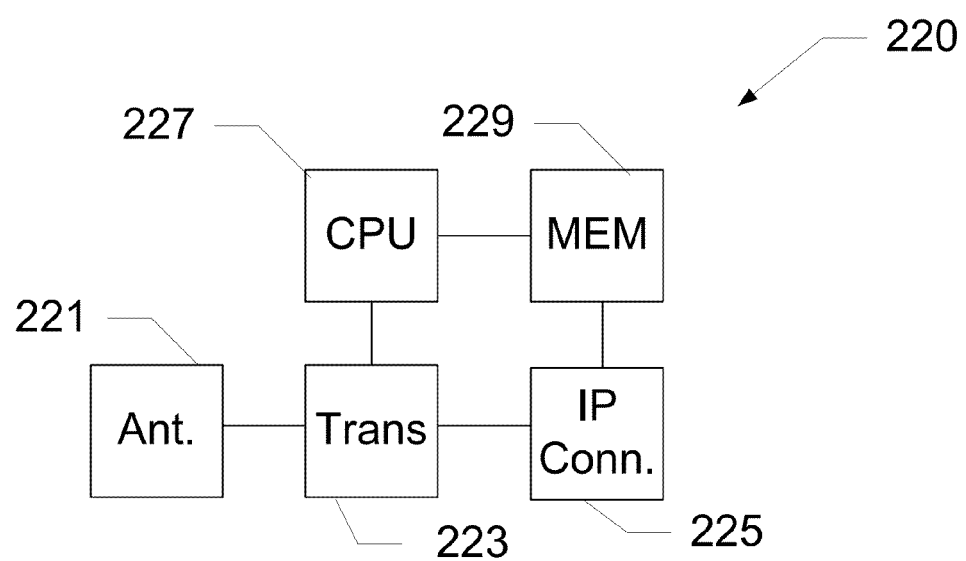
FIG. 2 shows a node having an IP interface, according to an exemplary embodiment of the present invention.

FIG. 2 shows the components of a node in a RAN, according to an exemplary embodiment of the present invention. A node 220, such as a BTS or Node B, typically includes a processing unit 227, memory 229 for storing logic and databases, a transceiver 223 connected to an antenna 221, and an IP interface 225. The node can be any one of a BTS and a Node B, and generally is a piece of equipment that facilitates wireless communication between a mobile device and a wireless network such as GSM, CDMA, WLL, WAN, WiFi, WiMAX etc. Multiple combinations of transceivers 223 and antennas 221 are possible within a single node, enabling access to several of said wireless networks. A BTS is also referred to as the radio base station (RBS), node B (in UMTS) or, simply, the base station (BS). Though the term BTS can be applicable to any of the wireless communication standards, it is generally and commonly associated with mobile communication technologies such as GSM and CDMA. In this regard, a BTS forms part of the base station subsystem (BSS) developments for system management. It may also have equipment for encrypting and decrypting communications, spectrum filtering tools (band pass filters), etc. Typically a BTS will have several transceivers 223 which allow it to serve several different frequencies and different sectors of the cell (in the case of sectorized base stations). A BTS is controlled by a parent base station controller (BSC, not shown) via the base station control function (BCF). Similarly, a Node B is the hardware that is connected to the mobile phone network that communicates directly with mobile devices. In contrast with GSM base stations, Node B uses WCDMA/TD-SCDMA as the air interface technology. Like BTS, Node Bs are controlled by an RNC (Radio Network Controller). However, WCDMA technology allows cells belonging to the same or different Node Bs and even controlled by different RNCs to overlap and still use the same frequency (in fact, the whole network can be implemented with just one frequency pair). Externally, components 223, 225, 227, and 229 of node 220 are housed in a cabinet, while antenna 221 (including a mast and an actual antenna) are exposed to the environment, and may be camouflaged for aesthetic purposes.

Figure 3:
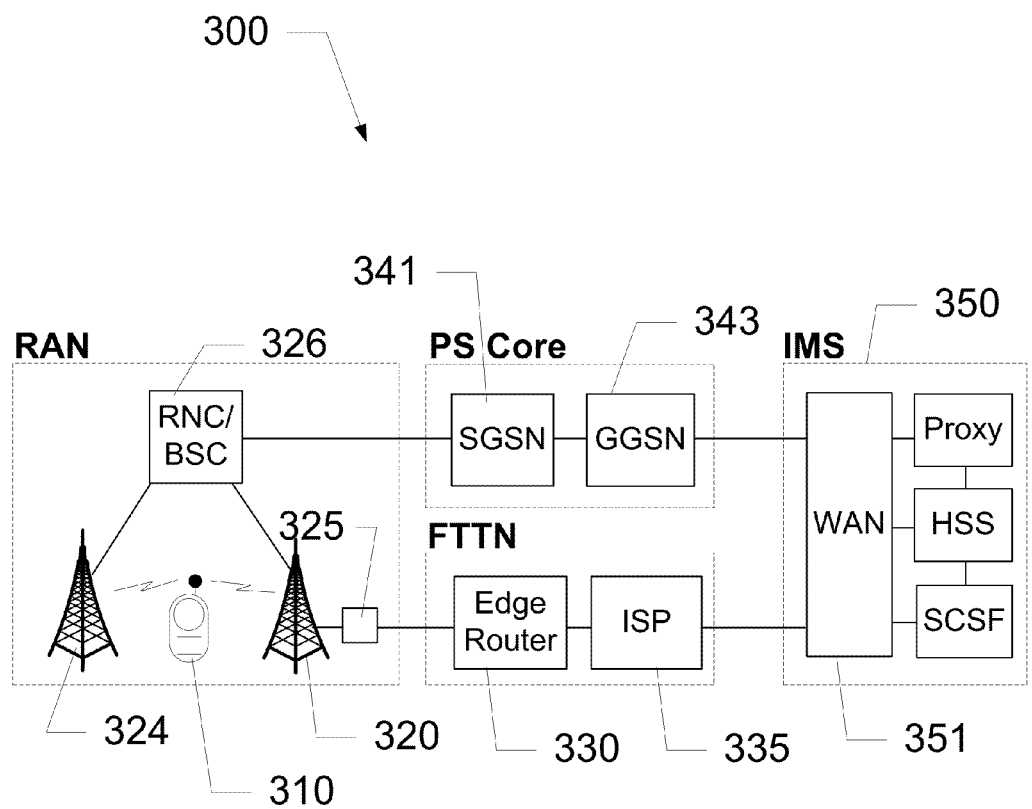
FIG. 3 shows a system for communicating with an IMS network via a wireless local loop, according to an exemplary embodiment of the present invention.

FIG. 3 shows a system for communicating with an IMS network via a wireless local loop, according to an exemplary embodiment of the present invention. System 300 includes a RAN, a PS Core, and an IMS network 350. The RAN includes nodes 320 and 324 controlled by a controller 326. Although mobile device 310 is shown within the RAN box, it is not necessarily a part of the terrestrial RAN. The RAN can be a UTRAN, GRAN, or any terrestrial radio access network depending on the implementation of the service provider. Nodes 320, 324 are hardware elements on a mobile phone network that connect mobile device 310 to a cellular network such as the UMTS network (not shown). According to exemplary embodiments, each node 320, 324 includes a cabinet, an antenna mast, an antenna, power amplifiers, a digital signal processor, and a power source in order to transmit and receive signals with mobile device 310. Although each node 320, 324 is generally controlled by controller 326, the emergence of High Speed Downlink Packet Access (HSDPA) involves some logic being handled on node 320, 324 for lower response times. Controller 326 carries out radio resource management, some of the mobility management functions, and is the point where encryption is done before user data is sent to and from mobile device 310.

Just like a traditional system, controller 326 interfaces with a packet-switched (PS) core network including gateways 341 and 343. Gateways 341, 343 are responsible for the delivery of data packets from and to the mobile devices within its geographical service area, and provide a link between the radio access network and IMS network 350. Tasks performed by SGSN 341 include packet routing and transfer, mobility management (attach/detach and location management), logical link management, and authentication and charging functions. GGSN 343 interfaces with other IP networks (not shown), as well as with IMS network 350 via WAN router 351. IMS 350 includes elements for providing IP based multimedia services such as VoIP, using a combination of session controllers (SCSF), user databases (HSS), and proxy servers.

However, unlike a traditional system, IP interface 325 enables a node 325 to communicate with a broadband IP network. In this embodiment, a fiber-to-the-node network is disclosed, including an edge router 330 and an ISP server 335 that provides the access. However, any local loop can be used, such as a wireless local loop, DSL, or any last-mile network. A wireless local loop (WLL) is a term for the use of a wireless communications link as the "last mile/first mile" connection for delivering plain old telephone service (POTS) and/or broadband Internet to telecommunications customers. Various types of WLL systems and technologies exist. Other terms for this type of access include Broadband Wireless Access (BWA), Radio In The Loop (RITL), Fixed-Radio Access (FRA) and Fixed Wireless Access (FWA).

In either case, interface 325 further includes logic to determine that a packet received from mobile device 310 is destined for IMS core 350. If the packet is destined for IMS core 350, interface 325 transmits the packet via edge router 330 to the broadband access network provided by ISP 335, and eventually to IMS core 350. If the packet is destined for another network such as the cellular network, then it is transmitted as usual to the controller and to the PS core network to be handled by the appropriate gateway. The option of using either the PS core network or bypassing the PS core network for direct IP access to IMS core 350 adds intelligence to node 320 as opposed to a less intelligent node 324, thereby alleviating network resources and providing a higher quality of service to a user of device 310. Device 310 may be a dual-mode device, thereby being able to communicate with both nodes 324 and 325, wherein each node operates on a different frequency, such as GSM, CDMA, UMTS, etc.

Figure 4:
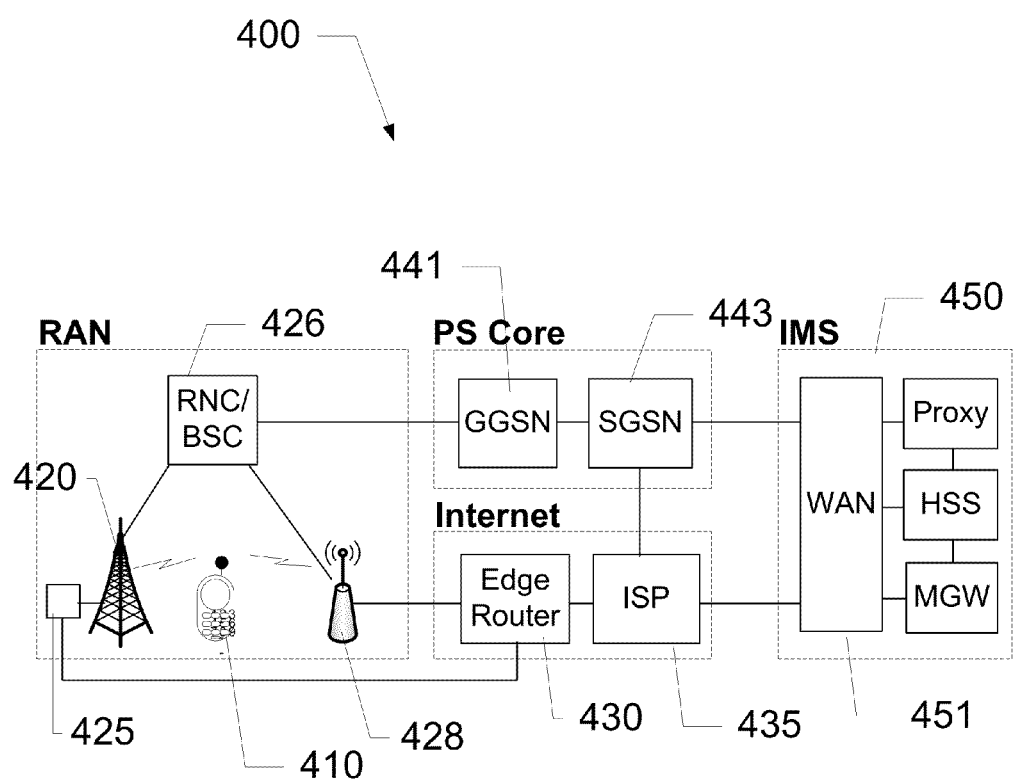
FIG. 4 shows a system for communicating with an IMS network using a femtocell, according to an exemplary embodiment of the present invention.

FIG. 4 shows a system for communicating with an IMS network using any one of a femtocell and a node, according to an exemplary embodiment of the present invention. System 400 includes a RAN, a PS Core, and an IMS network 450. The RAN includes node 420, femtocell 428, and controller 426. Although mobile device 410 is shown within the RAN box, it is not necessarily a part of the terrestrial RAN. The RAN can be a UTRAN, GRAN, or any terrestrial radio access network depending on the implementation of the service provider. Whereas node 420 connects mobile device 410 to a cellular network such as the UMTS network (not shown), femtocell 428 connects mobile device 410 to the internet via a broadband network. Controller 426 carries out radio resource management, some of the mobility management functions, and is the point where encryption is done before user data is sent to and from the mobile device. Just like a traditional system, controller 426 interfaces with a packet-switched (PS) core network including gateways 441 and 443. Gateways 441, 443 are responsible for the delivery of data packets from and to the mobile devices within its geographical service area, and provide a link between the radio access network and IMS network 450. Tasks performed by SGSN 441 include packet routing and transfer, mobility management (attach/detach and location management), logical link management, and authentication and charging functions. GGSN 443 interfaces with other IP networks (not shown), as well as with IMS network 450 via WAN router 451. IMS 450 includes elements for providing IP based multimedia services such as VoIP, using a combination of session controllers (SCSF), user databases (HSS), and proxy servers.

However, unlike a traditional system, IP interface 425 enables node 420 to communicate with a broadband IP network. In this embodiment, an IP network such as the Internet network is disclosed, including an edge router 430 and an ISP server 435 that provides the access. However, any IP network can be used, such as a private IP network operated by ISP 435, etc. This network can also be a "last mile" network for broadband internet access. Hence, femtocell 428 provides IP connectivity to mobile device 410. Femtocell 428 can be a femtocell or can offer WLAN connectivity to a WLAN transceiver on mobile device 410. Other combinations will be apparent to one having ordinary skill in the art in light of this disclosure.

In either case, interface 425 further includes logic to determine that a packet received from mobile device 410 is destined for IMS core 450. If the packet is destined for IMS core 450, interface 425 transmits the packet via edge router 430 to the broadband access network provided by ISP 435, and eventually to IMS core 450. If the packet is destined for another network such as the cellular network, then the packet is transmitted as usual to the controller and to the PS core network to be handled by the appropriate gateway. The option of using either the PS core network or bypassing the PS core network for direct IP access to IMS core 450 adds intelligence to node 420, thereby alleviating network resources and providing a higher quality of service to a user of device 410. Device 410 may be a dual-mode device, and equipped with logic to select either one of node 420 or femtocell 428 for access.

Figure 5:
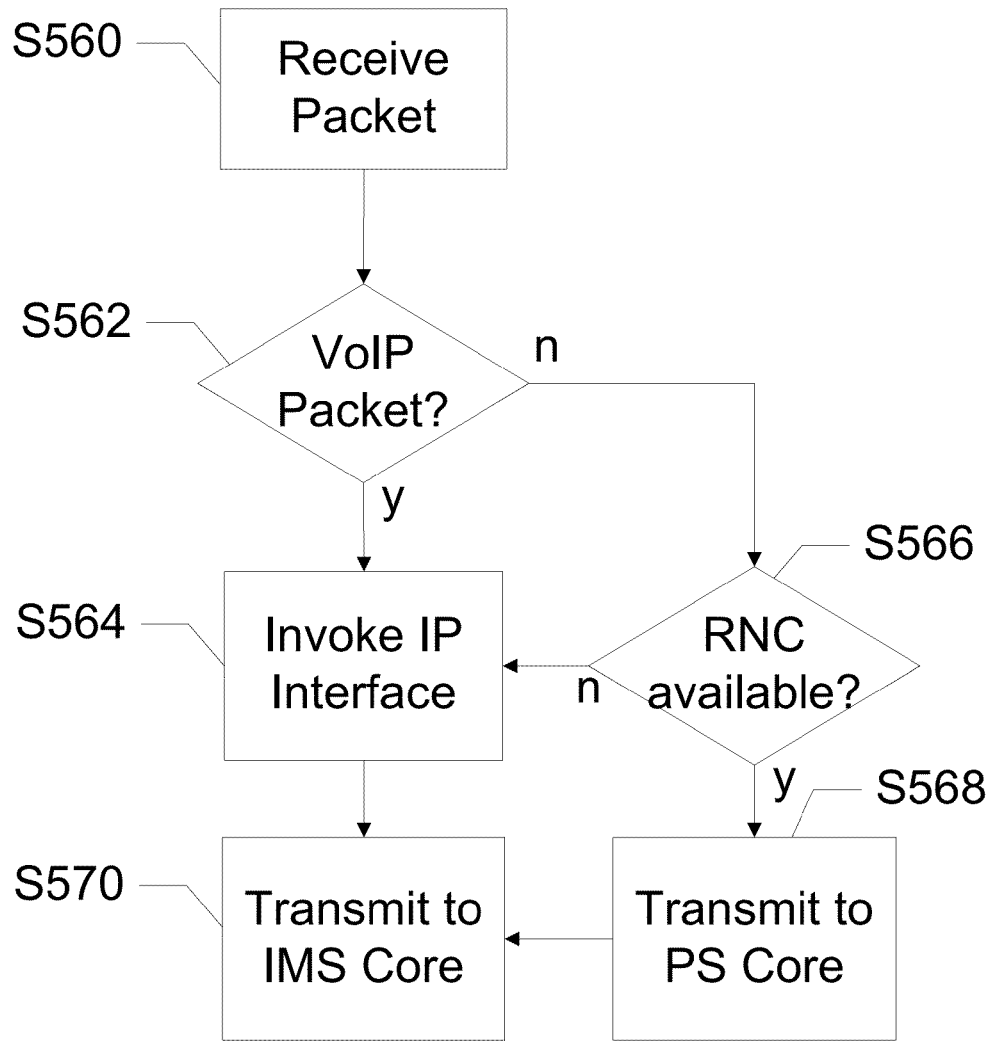
FIG. 5 shows a method for communicating with an IMS network, according to an exemplary embodiment of the present invention.

FIG. 5 shows a method for communicating with an IMS network, according to an exemplary embodiment of the present invention. The method is described from the perspective of a node within a RAN. The method includes receiving a data packet (S560) from a mobile device across a wireless network and determining (S562, S566) that the data packet is destined for an IP Multimedia System (IMS) network. In step S562, it is determined that the packet is a VoIP packet, and therefore the IP interface is invoked (S564). In step S566, assuming the packet is not a VoIP packet, it is determined whether or not the RNC is available or not for any reason, such as a network outage, downtime, etc. If the RNC is available, then the non-VoIP packet is transmitted to the packet-switched code (S568), and then transmitted to the IMS core (S570) as usual. However, if the RNC is not available in step S566, then the IP interface is again invoked in step S564. The IP interface utilizes any of the access methods determined above to access an IP network such as the internet, which provides the node with access to the IMS core network. The access method may be a wireless local loop, digital subscriber line (DSL), or any equivalent last mile. The packet is then transmitted to the IMS core (S570) without having to traverse the RNC and PS core networks. This alleviates load on the RAN and provides efficient methods for delivering VoIP and other data destined for the IMS core network.

In embodiments of the present invention, the nodes may connect to a controller through various means. Further, the IP interface is not restricted to using only wireless local loops or local broadband access. For instance, access to the IMS core or to the internet can be provided over a powerline network or powerline communication (PLC)—a method of carrying data on a conductor, where the conductor is also used for electronic power transmission. The PLC network uses a modulated carrier signal on the wiring system provided by a standard power grid, thereby reducing the infrastructure costs of setting up a new network. Typically, a transformer prevents a signal from propagating, so multiple PLC technologies may be bridged together to form a larger network. Different types of PLC use different frequency bands, depending upon the signal transmission characteristics of the power wiring used. Notably, the contents of the data packet are transparent to the operator of the powerline network. The data packet can only be accessed by the network layer, if preferred, thereby being viewable only when it is delivered to the UMTS network or to the mobile device. Alternatively, a node may connect to the IMS core or to a PS core via a satellite connection. The node is equipped with a satellite transceiver to communicate with other network elements such as an SGSN or a WAN router in order to transmit data packets to the IMS core. The satellite would contain one or more transponders, each transponder being a separate transceiver or repeater. Generally, these transponders relay what is received, with an amplification of the signal.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A node in a Radio Access Network (RAN), comprising:
 a transceiver;
 an antenna coupled to the transceiver, the antenna receiving signals from a mobile device;
 a processor in communication with the transceiver;
 an interface to a controller, the controller being in communication with a cellular network;
 a memory in communication with the processor; and
 an Internet Protocol (IP) interface in communication with the processor; the IP interface providing the node with access to an IP network;
 wherein the IP network includes an IP Multimedia System (IMS) network; and
 wherein a plurality of gateways in communication with the node enable communication between the controller and the IMS network;
 wherein the IP interface communicates with an edge router on a broadband network; wherein the broadband network is a wireless local loop; wherein the edge router enables communication between the node and the IMS network; wherein a data packet destined for the IMS network is transmitted to the IMS network via the IP interface to the wireless local loop.

2. The node of claim 1 wherein the controller is in communication with a Serving GPRS Support Node (SGSN) on a packet-switched core network.

3. The node of claim 1 wherein the controller is a Radio Network Controller (RNC), and wherein the node is a Node B.

4. The node of claim 1 wherein the controller is a Base Station Controller (BSC), and wherein the node is a Base Transceiver Station (BTS).

5. The node of claim 1, further comprising logic on the memory to receive a packet from the mobile device, determine that the packet is destined for the IP network, and forward the packet to the IP interface.

6. The node of claim 5, wherein the logic further receives a second packet from the mobile device, determines that the second packet is destined for the cellular network, and forwards the second packet to the controller.

7. The node of claim 1 wherein the IMS network initiates a SIP connection between the mobile device and a third party on the IP network.

8. A system for communicating with an IP Multimedia System (IMS) network, the system comprising:
  a node within a Radio Access Network (RAN), the node including an antenna to receive signals from a mobile device, and an interface to communicate with a wireless local loop;
  a controller in communication with the node;
  a plurality of gateways in communication with the node, the plurality of gateways enabling communication between the controller and the IMS network; and
  an edge router on the wireless local loop, the edge router enabling communication between the node and the IMS network;
  wherein a data packet destined for the IMS network is transmitted to the IMS network via the interface to the wireless local loop.

9. The system of claim 8, wherein the controller is a Radio Network Controller (RNC), and wherein the node is a Node B.

10. The system of claim 8, wherein the controller is a Base Station Controller (BSC), and wherein the node is a Base Transceiver Station (BTS).

11. The system of claim 8, wherein the plurality of gateways include at least one of a Serving GPRS Support Node (SGSN) and a Gateway GPRS Support Node (GGSN).

12. The system of claim 8, wherein the wireless local loop is a fiber-to-the-node (FTTN) network, the FTTN network further comprising a core router and a session border controller (SBC).

13. The system of claim 8, wherein the node is a femtocell.

14. The system of claim 8, further comprising the mobile device that originated the data packet and transmitted it to the node.

15. A method for communicating with an IP Multimedia System (IMS) network, the method comprising:
  receiving a data packet from a mobile device across a wireless network;
  determining that the data packet is destined for the IP Multimedia System (IMS) network;
  determining that a controller in communication with a gateway is unavailable, the gateway being part of a packet-switched (PS) core network; and
  forwarding the data packet to a wireless local loop network; wherein the wireless local loop network is in communication with the IMS network.

16. The method of claim 15, further comprising:
  receiving a second packet from the mobile device;
  determining that the second packet is destined for a cellular network; and
  forwarding the second packet to the controller.

* * * * *